(12) United States Patent
Bennett et al.

(10) Patent No.: US 7,877,442 B1
(45) Date of Patent: Jan. 25, 2011

(54) CONTEXT-AWARE PROCESSES FOR ALLOWING USERS OF NETWORK SERVICES TO ACCESS ACCOUNT INFORMATION

(75) Inventors: Victor Bennett, Los Altos Hills, CA (US); Gorkem Ozcelebi, San Francisco, CA (US)

(73) Assignee: Google Inc., Mountain View, CA (US)

( * ) Notice: Subject to any disclaimer, the term of this patent is extended or adjusted under 35 U.S.C. 154(b) by 25 days.

(21) Appl. No.: 12/488,448

(22) Filed: Jun. 19, 2009

Related U.S. Application Data (63) Continuation of application No. 10/842,697, filed on May 11, 2004, now Pat. No. 7,577,702.

(51) Int. Cl.
*G06F 15/16* (2006.01)
(52) U.S. Cl. ............... 709/203; 709/217; 709/223; 709/224; 705/14; 705/26
(58) Field of Classification Search ........... 709/203, 709/217, 219, 223, 224; 705/14, 26
See application file for complete search history.

(56) References Cited

U.S. PATENT DOCUMENTS

| | | | | |
|---|---|---|---|---|
| 6,243,750 B1 * | 6/2001 | Verma | | 709/224 |
| 6,317,782 B1 * | 11/2001 | Himmel et al. | | 709/218 |
| 6,442,529 B1 * | 8/2002 | Krishan et al. | | 705/14 |
| 6,487,538 B1 * | 11/2002 | Gupta et al. | | 705/14 |
| 7,222,105 B1 * | 5/2007 | Romansky | | 705/57 |
| 7,340,428 B1 * | 3/2008 | White et al. | | 705/37 |
| 2001/0047297 A1 * | 11/2001 | Wen | | 705/14 |
| 2002/0129102 A1 * | 9/2002 | Landsman et al. | | 709/203 |
| 2004/0044571 A1 * | 3/2004 | Bronnimann et al. | | 705/14 |
| 2005/0289005 A1 * | 12/2005 | Ferber et al. | | 705/14 |
| 2008/0140502 A1 * | 6/2008 | Birnholz et al. | | 705/10 |
| 2008/0300986 A1 * | 12/2008 | Lee | | 705/14 |

OTHER PUBLICATIONS

V. Bennett et al., co-pending U.S. Appl. No. 10/842,697, filed May 11, 2004, entitled "Context-Aware Processes for Allowing Users of Network Services to Access Account Information".

* cited by examiner

*Primary Examiner*—Lashonda T Jacobs
(74) *Attorney, Agent, or Firm*—Harrity & Harrity, LLP (57) ABSTRACT

A system provides account statistics to a user of a network service. The system provides access, to a user, to the network service. The system determines one of an environmental attribute or context associated with the user's access of the network service. The system provides, contemporaneously with the access of the network service, a document to the user, where the document includes account statistics related to the one of the determined environmental attribute or content.

23 Claims, 7 Drawing Sheets

CONTEXT-AWARE PROCESSES FOR ALLOWING USERS OF NETWORK SERVICES TO ACCESS ACCOUNT INFORMATION

RELATED APPLICATION

This application is a continuation of U.S. application Ser. No. 10/842,697, filed May 11, 2004, the entire contents of which is incorporated herein by reference.

BACKGROUND

1. Field of the Invention

Systems and methods consistent with the principles of the invention relate generally to network services and, more particularly, to context-aware processes for allowing users of network services to access account information

2. Description of Related Art

The current status quo for users with accounts with network services (e.g., Internet services) is to visit a Uniform Resource Locator (URL) and provide a unique identifier and password to receive access to the users' account information. This process is detrimental in that a user must leave the context that raised their account related questions in order to have the questions answered. This process can be burdensome to users. For example, publishers and advertisers, who participate in web advertising, have to log in to their account to get information regarding their account's performance. Web advertising publishers host ads from advertisers and collect revenue from the advertisers based on the number of "hits" the ads receive from users accessing documents published by the publishers. Third party publishers may also host their own web pages that further receive, and publish, advertisements maintained by a server associated with a web ad generating entity. The third party publishers may receive revenue from the web ad generating entity based on the number of hits the third party publishers receive on the advertisements published on their own web pages. Web advertising publishers and advertisers, however, cannot access information on how a particular ad performs while viewing the document that includes the ad. Existing account data access processes, therefore, fail to provide account statistics related to a user's current context or state.

SUMMARY OF THE INVENTION

According to one aspect, a method of accessing account information associated with a network service is provided. The method may include determining an environmental attribute or context associated with a first document accessed by a client associated with a user of a network service. The method may further include receiving, from the client, account identification information related to the network service. The method may also include sending a second document to the client based on the accessing of the first document, where a content of the second document is based on the account identification information and is related to the determined environmental attribute or context associated with the first document.

According to another aspect, a method of providing account statistics to a user of a network service is provided. The method may include providing access, to a user, to the network service. The method may further include determining one of an environmental attribute or context associated with the user's access of the network service. The method may also include providing, contemporaneously with the access of the network service, a document to the user, wherein the document includes account statistics related to the one of the determined environmental attribute or content.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

A "document," as the term is used herein, is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link" as the term is used here, is to be broadly interpreted to include any reference to or from a document.

Exemplary Overview

Figure 1:
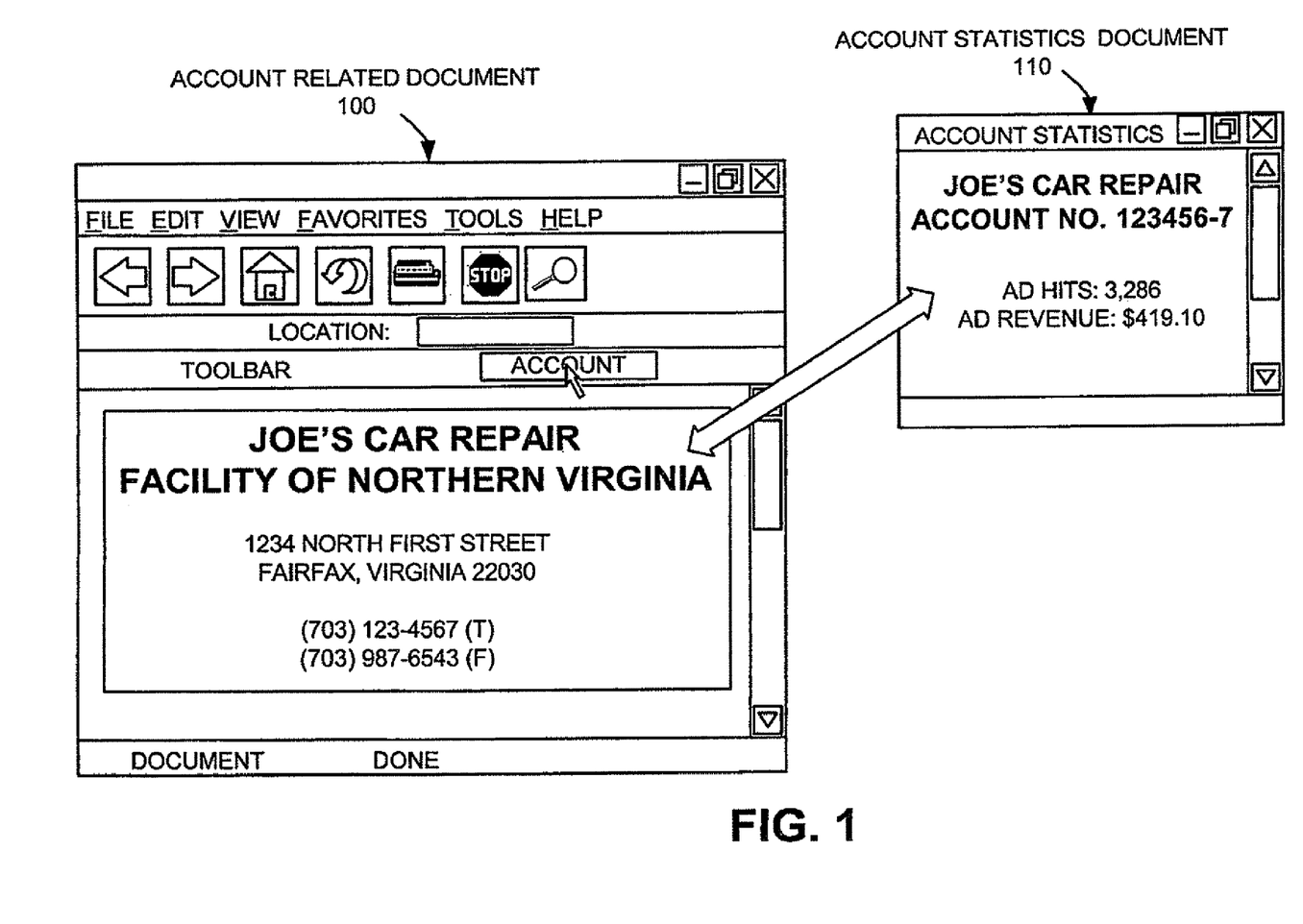
FIG. 1 is a diagram of an overview of an exemplary aspect of the invention.

FIG. 1 illustrates an overview of the provision of context and/or environment specific account statistics of a user of a network service according to an exemplary aspect of the invention. As shown in FIG. 1, an account related document 100 may be accessed by a user of a network service. For example, as shown in FIG. 1, a user may access a document 100 containing the user's advertisement that is being published by a server. Alternatively, the user may access a document 100, maintained at a first server, which may include other content generated by the user in addition to advertisements received from another ad-generating server. Contemporaneously with access of the document 100, a context or environmental attribute associated with the accessed document may be transmitted to the server (e.g., the publishing server, or the ad-generating server). The context may include, but is not limited to, an identification of the specific document 100 accessed by the user or a username associated with the user. The environmental attribute may include, but is not limited to, a time associated with access of the document 100, a size of the accessed document 100 (e.g., if document 100 includes a webpage, the window size of the webpage), or a current performance parameter associated with the user's own system.

Responsive to receipt of the context or environmental attribute, the server may return an account statistics document 110 that includes statistics, associated with the user's account with the network service provided by the server, related to the transmitted context or environmental attribute. For example, if document 100 contains the user's web advertisement, then account statistics document 110 may include a number of times the ad has been viewed by other users and the ad revenue generated for the organization that operates the publishing server. Alternatively, if document 100 contains user content in addition to advertisements received from an ad-generating server, then account statistics document 110 may include statistics, associated with the user's account with the ad-generating server, related to the transmitted context or environmental attribute.

Account statistics document 110 may, in another implementation, include traffic and revenue information for web self-publisher services, such as, for example, services such as blogs, hosting services, and services accepting micro-payments for content. In yet another implementation, document 100 may include data related to an auctioned item maintained by an on-line auctioning service provider, and account statistics document 110 may include traffic and bid information for the online auction service provider. In a further implementation, account related document 100 may include a web page of a product merchant that displays one or more products of the merchant and, account statistics document 110 may include data related to what information from document 100 is contained in documents maintained by a web product searching service (e.g., Froogle).

Exemplary Network Configuration

Figure 2:
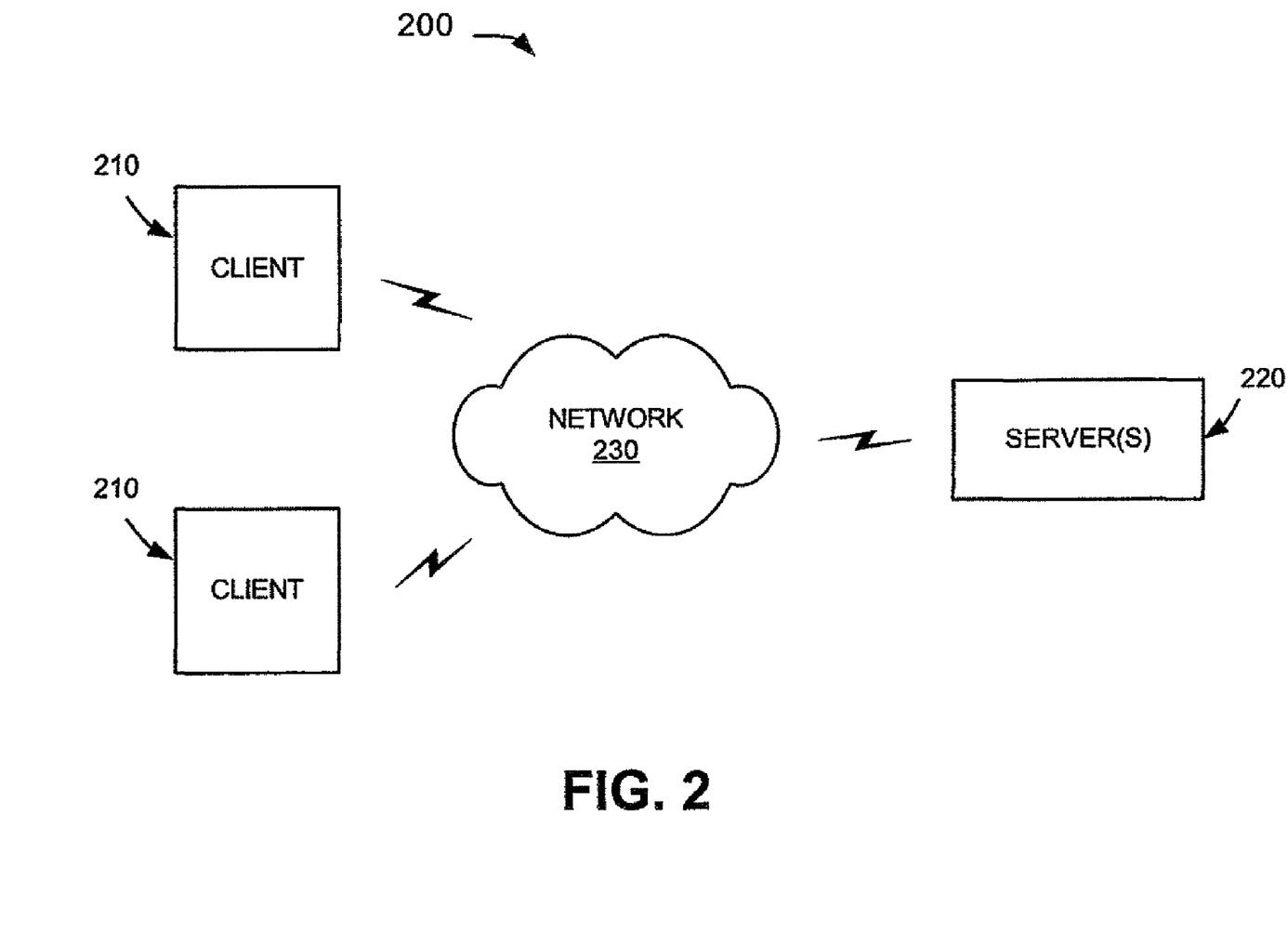
FIG. 2 is a diagram of an exemplary network in which systems and methods consistent with principles of the invention may be implemented.

FIG. 2 is an exemplary diagram of a network 200 in which systems and methods consistent with the principles of the invention may be implemented. Network 200 may include multiple clients 210 connected to a server(s) 220 via a network 230. Network 230 may include a local area network (LAN), a wide area network (WAN), a telephone network, such as the Public Switched Telephone Network (PSTN), an intranet, the Internet, a memory device, another type of network, or a combination of networks. Two clients 210 and a single server 220 have been illustrated as connected to network 230 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Clients 210 and server 220 may connect to network 230 via wired, wireless, and/or optical connections. One or more users may be associated with each client 210, and each user may have an account with a network service provided by server 220.

Server 220 may store or maintain documents associated with the provided network service. For example, if server 220 hosts an advertisement publishing network service, server 220 may store or maintain documents containing ads received from subscribing advertisers. Server 220 may also store or maintain documents that may include data related to published news stories, products, images, user groups, geographic areas, advertisements, or any other type of data. For example, server 220 may store or maintain news stories from any type of news source, such as, for example, the Washington Post, the New York Times, Time magazine, or Newsweek. As another example, server 220 may store or maintain data related to specific product data, such as product data provided by one or more product manufacturers. As yet another example, server 220 may store or maintain data related to other types of web documents, such as pages of web sites. Users at clients 210 may access the documents stored or maintained by server 220.

In an implementation consistent with the principles of the invention, server 220 may receive requests from clients 210 to display statistics associated with user accounts related to any current environmental attribute or context associated with the access of documents maintained or stored at server 220. The context may include, but is not limited to, a username associated with the user, or an identification of the specific document accessed by the user. The environmental attribute may include, but is not limited to, a time associated with access of the document, a size of the accessed document (e.g., if the document includes a webpage, the window size of the webpage), or a current performance parameter associated with the user's system.

While server 220 is shown as a single entity, it may be possible for more than one server to perform the functions of server 220. For example, it may also be possible for server 220 to be implemented as two or more separate (and possibly distributed) devices.

Exemplary Client/Server Architecture

Figure 3:
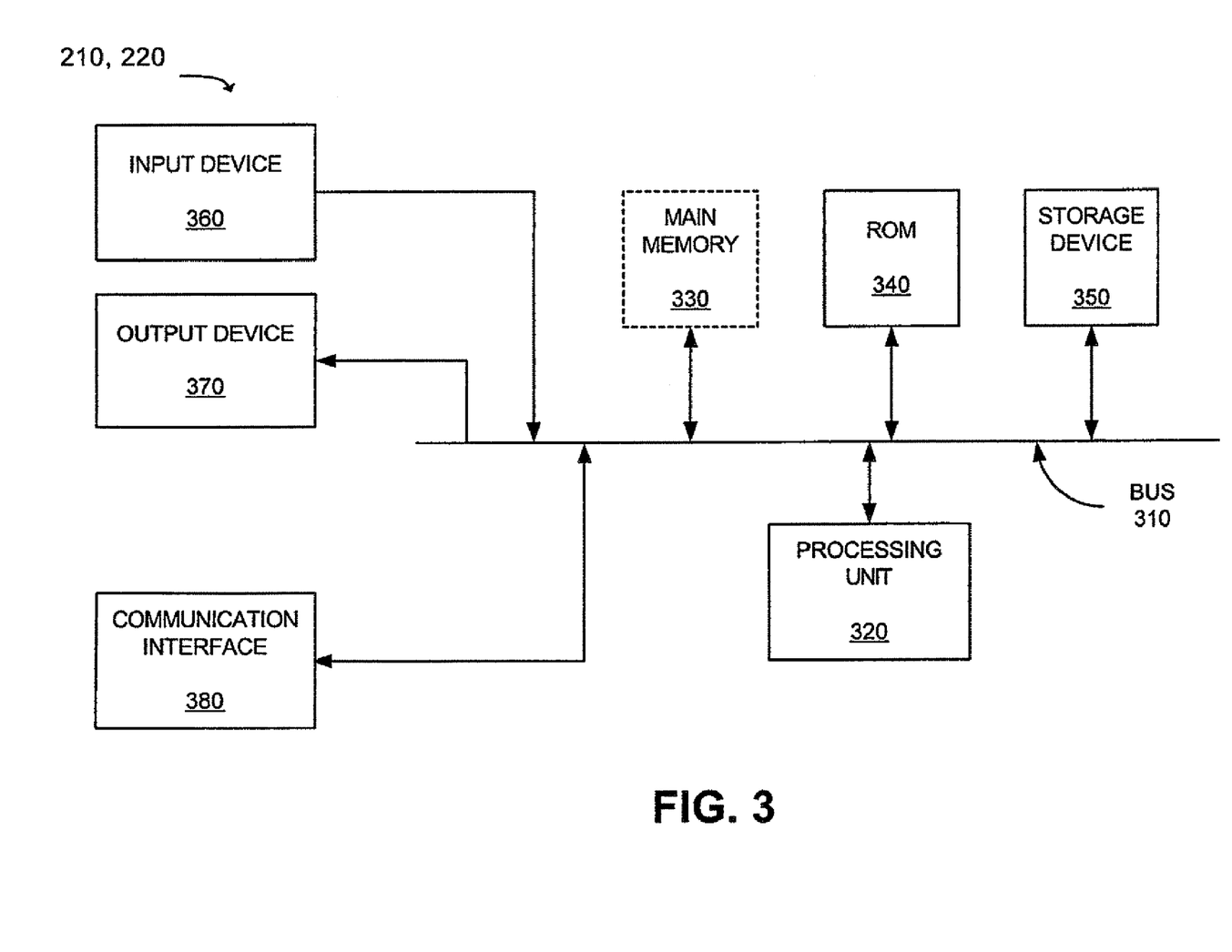
FIG. 3 is an exemplary diagram of a client and/or server of FIG. 2 in an implementation consistent with principles of the invention.

FIG. 3 is an exemplary diagram of a client or server entity (hereinafter called "client/server entity"), which may correspond to one or more of clients 210 and server 220, according to an implementation consistent with the principles of the invention. The client/server entity may include a bus 310, a processing unit 320, an optional main memory 330, a read only memory (ROM) 340, a storage device 350, an input device 360, an output device 370, and a communication interface 380. Bus 310 may include a path that permits communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity, consistent with the principles of the invention, may perform certain network service related operations. The client/server entity may, in some implementations, perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Processing

Figure 4A:
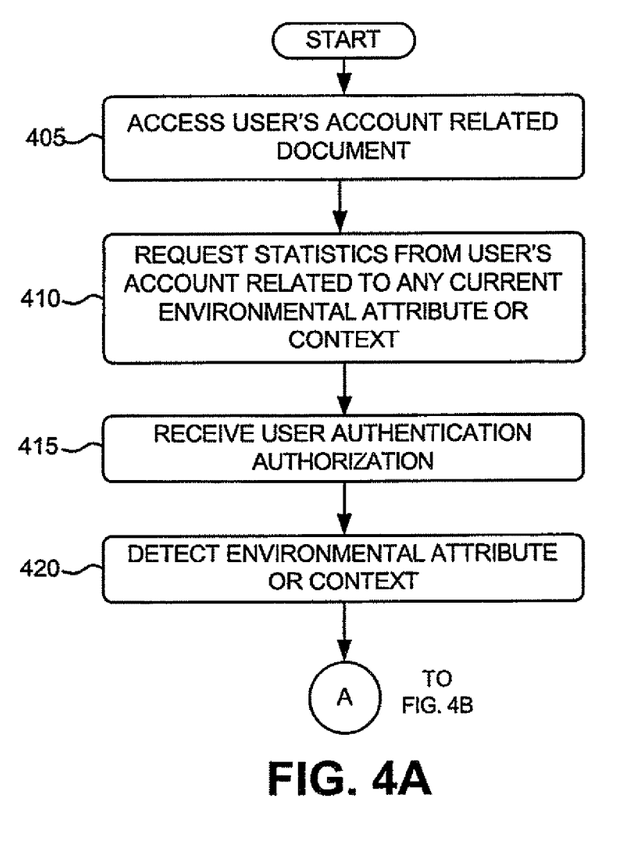
FIGS. 4A and 4B are flowcharts of exemplary processing for accessing account statistics related to a user's current context or state according to an implementation consistent with principles of the invention.

FIGS. 4A and 413 are flowcharts of exemplary processing for accessing network service account statistics related to a user's current context or state according to an implementation consistent with the principles of the invention. As one skilled in the art will appreciate, the processing exemplified by FIGS. 4A and 4B can be implemented in software and stored on a computer-readable memory, such as main memory 330, ROM 340 or storage device 350 of a client 210 or server 220, as appropriate. In other implementations, the processing exemplified by FIGS. 4A and 4B can be implemented in hardwired circuitry, such as combinational logic, within processing unit 320 of a client 210 or server 220, as appropriate.

Figure 5:
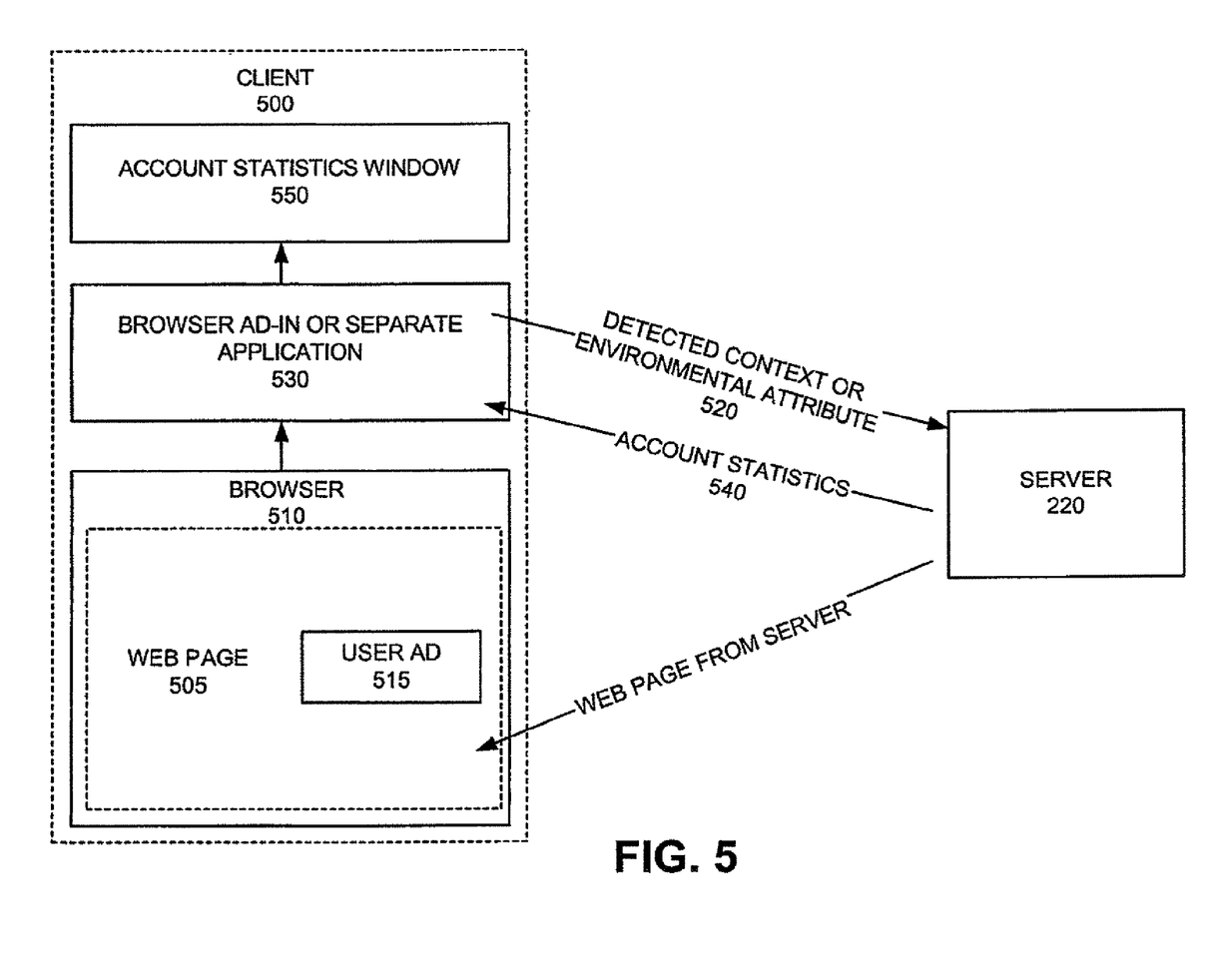
FIGS. 5 and 6 illustrate exemplary implementations of the processing of FIGS. 4A and 4B consistent with principles of the invention.
Figure 6:
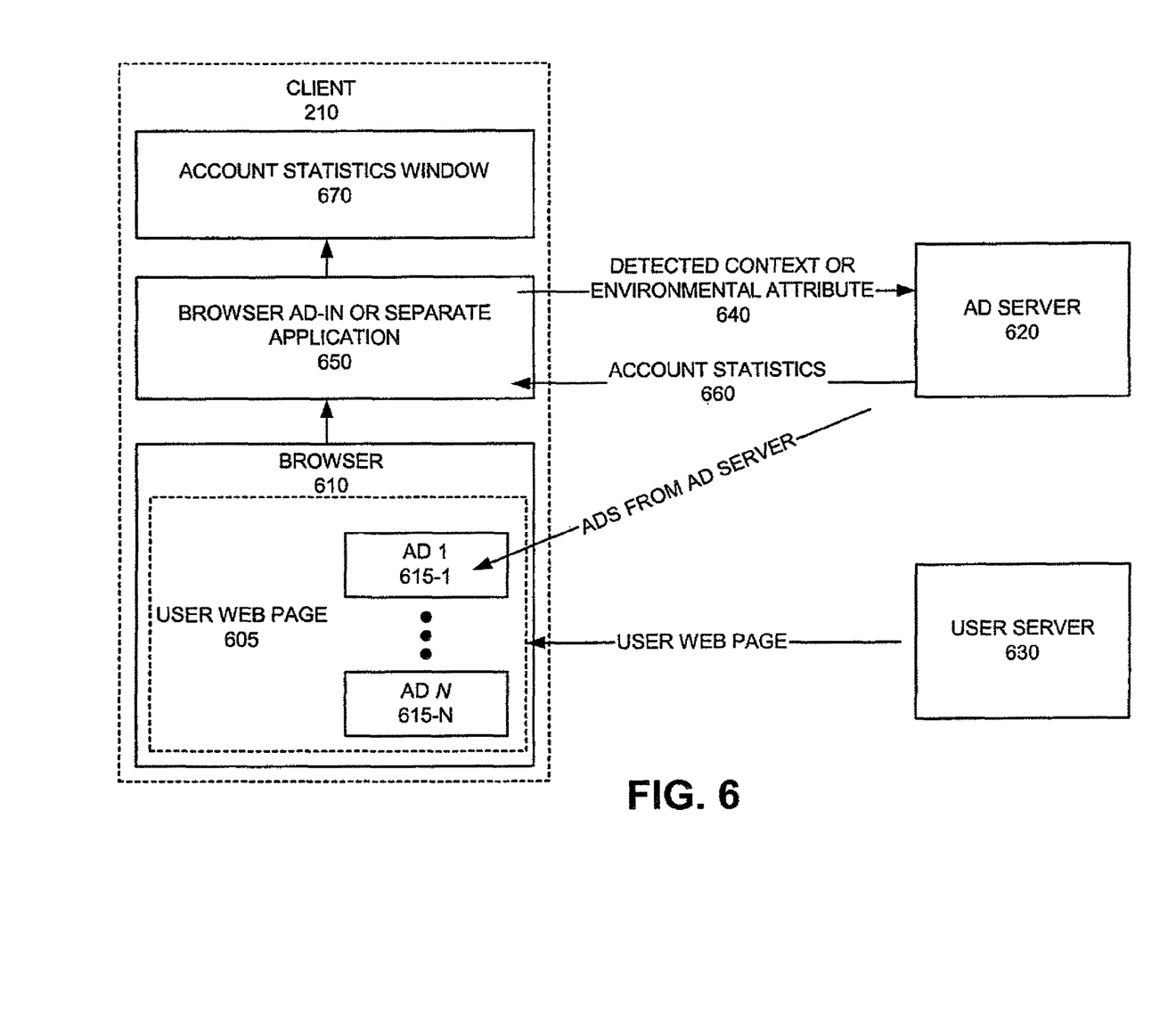

Processing may begin with a user accessing an account related document (act 405) (FIG. 4A). A client 210, associated with the user, may access and retrieve the account related document from a server, such as server 220. FIG. 5 illustrates one exemplary implementation of the invention where the account related document includes a web page 505 displayed in a web browser 510. The browser 510 may be implemented in a client 210 associated with the user. The web page 505 may include a user advertisement 515; generated by the user, which was previously placed with a server 220 that provides an ad publishing network service. The user may pay an entity that operates server 220 for each hit that occurs on user ad 515 by other users viewing the ad 515. FIG. 6 illustrates another exemplary implementation of the invention where the account related document further includes a user web page 605 displayed in a web browser 610. The user web page 605 may include data generated by the user, and hosted by user server 630, in addition to advertisements (ad 1 615-1 through 615-N) received from an ad server 620. The user may have previously placed the user web page 605 with user server 630. Ads 615-1 through 615-N may be included in user web page 605 based on the user establishing an account with ad server 620, such that the user receives revenue for permitting the ads 615-1 through 615-N to be displayed on the user's web page 605. The revenue received by the user may be based on a number of hits received on the one or more ads included in the user's web page 605.

Statistics from a user's account related to any current environmental attribute or context associated with the accessed account related document may be requested (act 410). The request may, in one implementation of the invention, be transmitted from a user at a client 210 to the server automatically and contemporaneously with the user's access of the account related document. The request may include an account user name and password previously stored in memory by the user. The request may be sent from client 210 to server 220 using any type of existing messaging protocol. In one implementation, the user may, via a toolbar of a web browser, access a window that permits the user to enter the user's username and password. The entered username and password may then be stored in memory for subsequent retrieval. User authentication authorization may then be received from the server (act 415). The authentication authorization may be received in response to the request being sent, after access of the account related document at client 210, from the client 210 to the server containing, for example, the user's account username and password.

An environmental attribute or context, associated with the displayed account related document, may then be detected (act 420). The environmental attribute may include, but is not limited to, a time associated with access of the document, a size of the accessed document (e.g., if the document includes a webpage, the window size of the webpage), or current performance parameters of the user's system. The context may include, but is not limited to, an identification of the specific document accessed by the user or a username associated with the user. The detected environmental attribute or context may then be reported to server 220 (act 425). In the exemplary implementation of FIG. 5, the detected context and/or environmental attribute 520 may be sent from a browser ad-in or separate application 530 of client 210 to server 220. Similarly, in the exemplary implementation of FIG. 6, the detected context and/or environmental attribute 640 may be sent from a browser ad-in or separate application 650 of client 210 to ad server 620. Client 210 may use existing messaging protocols to report the detected environmental attributed or context to the server.

Figure 4B:
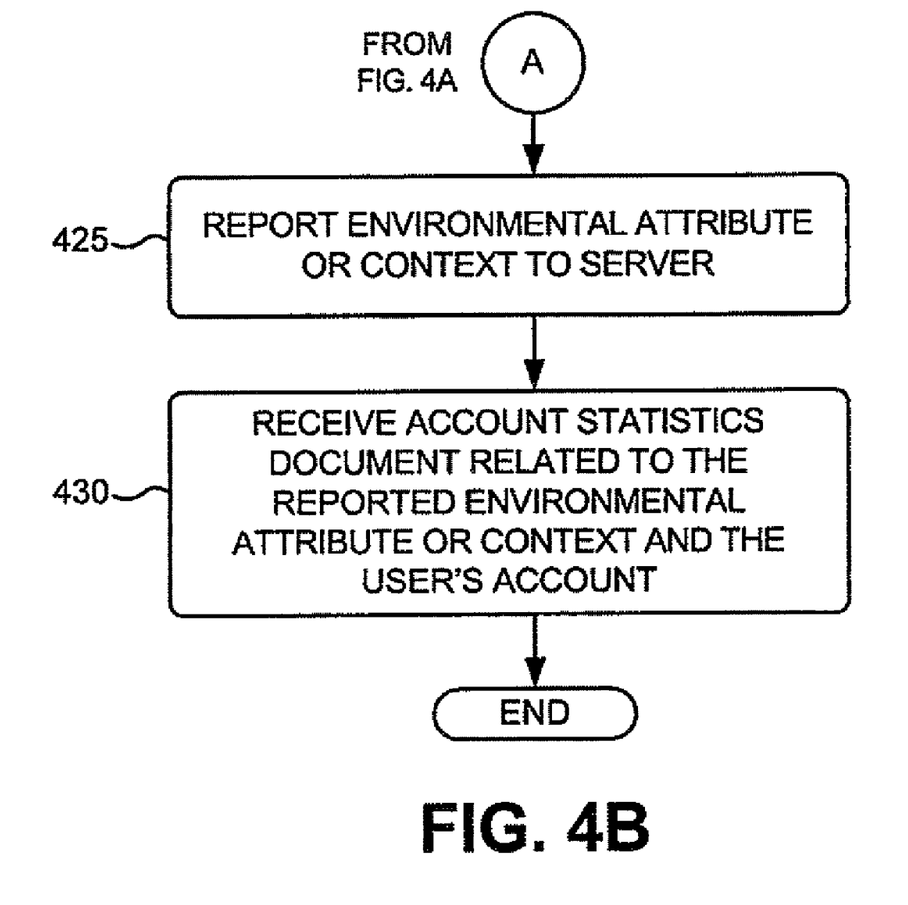

An account statistics document, related to the reported environmental attribute or context and the user's account, may be received (act 430). A client 210 associated with the user may receive the account statistics document from the server (e.g., server 220 or ad server 620). In the exemplary implementation of FIG. 5, account statistics 540 may be received at client 210's browser ad-in or separate application 530. The account statistics 540 may be displayed as a separate account statistics window 550 in client 210. Similarly, in the exemplary implementation of FIG. 6, account statistics 660 may be received at client 210's browser ad-in or separate application 650. The account statistics 660 may be displayed as a separate account statistics window 670 in client 210. The user may view the account statistics to determine relevant statistics, such as number of hits, revenue, etc.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 4A and 4B, the order of the acts may be modified in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein. Further, certain portions of the invention have been described as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
identifying, by one or more processors associated with one or more server devices, a first document accessed by a client device, where the first document is related to a network service, where the client device is associated with a user of the network service, and where the first document includes a webpage, associated with the user, that includes an advertisement;
determining, by one or more processors associated with the one or more server devices, account identification information related to the user and the network service; and
causing, by one or more processors associated with the one or more server devices and in response to identifying the first document accessed by the client device, a second document to be sent to the client device, where the second document is based on the received account identification information, and where the second document includes traffic and revenue information associated with the advertisement.

2. The method of claim 1, further comprising:
in response to identifying the first document accessed by the client device, determining an environmental attribute associated with the first document, where the environmental attribute comprises at least one of:
a size of the first document,
a time associated with accessing the first document, or
a current system performance measurement associated with accessing the first document,
where the second document is further based on the determined environmental attribute.

3. The method of claim 1, where the account identification information includes:
a user name, and
a password associated with the user.

4. The method of claim 1, where
the network service includes a web advertising service, and
the advertisement is maintained by the web advertising service.

5. The method of claim 1, where the first document and the second documents are served, to the client device, from a remote server device.

6. The method of claim 1, where
the first document is served, to the client device, from a first remote server device,
the second document is served, to the client device, from a second remote server device, and
the first remote server device is different from the second remote server device.

7. The method of claim 1, further comprising:
providing the client device access to the first document,
where causing the second document to be sent, to the client device, includes, contemporaneously to providing the client device access to the first document, providing the client device access to the second document.

8. A server, comprising:
a network interface coupled, via a network, to a client device, where the client device is associated with a user of a network service; and
a processor to:
identify a first document accessed by the client device via the network, where the first document includes an advertisement,
receive, from the client device and via the network interface, account identification information related to the network service, and
cause a second document to be sent to the client device in response to identifying the first document accessed by the client device, where the second document is based on the account identification information, and where the second document includes traffic and revenue information related to the advertisement.

9. The server of claim 8,
where the processor is further to, in response to identifying the first document accessed by the client device, determine an environmental attribute associated with the first document, where the environmental attribute comprises at least one of:
a size of the first document,
a time associated with accessing the first document, or
a current system performance measurement associated with accessing the first document, and
where the second document is further based on the determined environmental attribute.

10. The server of claim 8, where the account identification information includes:
a user name, and
a password associated with the user.

11. The server of claim 8, where
the network service includes a web advertising service, and
the advertisement is maintained by the web advertising service.

12. The server of claim 8, where the first document and the second documents are served, to the client device, from a remote server device.

13. The server of claim 8, where
the first document is served, to the client device, from a first remote server device,
the second document is served, to the client device, from a second remote server device, and
the first remote server device is different from the second remote server device.

14. The server of claim 8,
where the processor is further to:
provide, to the client device, access to the first document, and
where the processor, when causing the second document to be sent to the client device, is further to:
provide, to the client device, access to the second document contemporaneously to providing the client device access to the first document.

15. A computer-readable storage device containing instructions to control at least one processor associated with one or more server devices, to perform a method comprising:

provide, to a user, access to a first document, where the first document includes an advertisement;

determining account identification information associated with the user; and contemporaneously to providing access to the first document, providing, to the user, access to a second document, where the second document is based on the determined account identification information, and where the second document includes traffic and revenue information related to the advertisement.

16. The computer-readable storage device of claim 15, where the first document is a webpage associated with the user.

17. The computer-readable storage device of claim 15, where determining the account identification information associated with the user includes receiving, from the user, the account identification in response to providing, to the user, access to the first document.

18. The computer-readable storage device of claim 15, where the method further comprises:

determining, in response to providing access to the first document, an environmental attribute associated with the first document, where the environmental attribute comprises at least one of:

a size of the first document, a time associated with accessing the first document, or a current system performance measurement associated with accessing the first document, where the second document is further based on the determined environmental attribute.

19. The computer-readable storage device of claim 15, where the account identification information includes:

a user name, and a password associated with the user.

20. The computer-readable storage device of claim 15, where the advertisement is maintained by a web advertising service.

21. The computer-readable storage device of claim 15, where the second document further includes account statistics related to access of the first document by users.

22. The computer-readable storage device of claim 15, where the first document and the second documents are served, to the user, from a remote server device.

23. The computer-readable storage device of claim 15, where the first document is served, to the user, from a first remote server device, the second document is served, to the user, from a second remote server device, and the first remote server device is different from the second remote server device.

* * * * *